(12) United States Patent
Gold et al.

(10) Patent No.: US 8,868,970 B2
(45) Date of Patent: Oct. 21, 2014

(54) OBJECT BASED STORAGE SYSTEM AND METHOD OF OPERATING THEREOF

(75) Inventors: Israel Gold, Haifa (IL); Yechiel Yochai, Moshav Aviel (IL); Julian Satran, Atlit (IL)

(73) Assignee: Infinidat Ltd., Hertzelia (IL)

( * ) Notice: Subject to any disclaimer, the term of this patent is extended or adjusted under 35 U.S.C. 154(b) by 220 days.

(21) Appl. No.: 13/603,470

(22) Filed: Sep. 5, 2012

(65) Prior Publication Data

US 2013/0067269 A1 Mar. 14, 2013

Related U.S. Application Data

(60) Provisional application No. 61/532,270, filed on Sep. 8, 2011.

(51) Int. Cl.
*G06F 11/00* (2006.01)
*G06F 11/20* (2006.01)

(52) U.S. Cl.
CPC ........ *G06F 11/2033* (2013.01); *G06F 11/2038* (2013.01); *G06F 11/2046* (2013.01)
USPC ............................................. 714/13; 714/4.11

(58) Field of Classification Search
CPC G06F 11/2033; G06F 11/201; G06F 11/2043
USPC .................................................. 714/4.11, 13
See application file for complete search history.

(56) References Cited

U.S. PATENT DOCUMENTS

| | | | |
|---|---|---|---|
| 6,609,213 B1 * | 8/2003 | Nguyen et al. | 714/4.12 |
| 6,944,785 B2 * | 9/2005 | Gadir et al. | 714/4.11 |
| 6,990,547 B2 * | 1/2006 | Ulrich et al. | 710/304 |
| 7,058,846 B1 * | 6/2006 | Kelkar et al. | 714/4.4 |
| 7,076,691 B1 * | 7/2006 | Dobberpuhl et al. | 714/13 |
| 7,437,608 B2 * | 10/2008 | Kalos et al. | 714/16 |
| 7,506,009 B2 * | 3/2009 | Singh et al. | 1/1 |
| 7,971,089 B2 * | 6/2011 | Yoshikawa et al. | 714/4.11 |

* cited by examiner

*Primary Examiner* — Philip Guyton
(74) *Attorney, Agent, or Firm* — Oren Reches (57) ABSTRACT

A method and a storage system for managing logical objects, wherein the storage system includes a plurality of control servers and the method includes: (i) defining a plurality of object pools and associating each logical object, hosted in the storage system, with one of the plurality of object pools; (ii) configuring each control server to have a primary responsibility over at least two of the object pools, such that each object pool is controlled by one primary control server, configured to handle requests directed to logical objects associated with the object pool; and (iii) in response to a failure of one of the plurality of control servers, configuring each operational server of the plurality of control servers to take over primary responsibility for at least one object pool, originally defined under the primary responsibility of the failed control server.

18 Claims, 5 Drawing Sheets

FIG. 3 defining a plurality of object pools and assigning objects to the object pools
410 configuring each control server among the plurality of control servers to have a primary responsibility over at least two of the object pools
420 configuring each control server among the plurality of control servers to have a secondary responsibility over at least two other pools of the object pools
430 responsive to receiving an access request indicative of an object identifier related to a first logical object, identifying, in accordance with the object identifier, a first object pool associated with the first logical object, and directing the access request to a first server configured with a primary responsibility for the first object pool
440 responsive to a failure of one of the plurality of control servers, configuring each operational server of the plurality of control servers to takeover primary responsibility over at least one object pool currently defined under the primary responsibility of the one failed control server
450

OBJECT BASED STORAGE SYSTEM AND METHOD OF OPERATING THEREOF

CROSS-REFERENCES TO RELATED APPLICATIONS

This application relates to and claims priority from U.S. Provisional Patent Application No. 61/532,270 filed on Sep. 8, 2011 and is incorporated herein by reference in its entirety.

TECHNICAL FIELD

The present invention relates generally to object based storage systems and, particularly, to distributed management of an object storage.

BACKGROUND

Traditional storage systems use to store structured data as part of file systems, where specific information is stored based on directories hierarchy, or as part of databases, where specific information is stored based on a methodology of columns and rows. Today, more and more of the world's mass data constitutes unstructured data, as any content, from videos, music files, blogs, images, instant messages is being created, distributed and stored digitally. Unstructured data is expected to far outpace the growth of structured data. It is estimated that most of the amount of digitized information in the near future will come from unstructured data, and only few percent being driven by traditional structured data.

Today's dominant approach is to store unstructured data on file systems such as Network Attached Storage (NAS). However, NAS was designed when most of the content was much less digitized and unstructured data was not as prevalent as it is today.

Object storage has emerged as the preferred choice to handle the massive amounts of unstructured data, managed by some of the largest public cloud services like Amazon, Google and Facebook.

An object storage raises the level of abstraction presented by today's block devices. Instead of presenting the abstraction of a logical volume of unrelated blocks, addressed by their offset in a volume (i.e., their Logical Block Address (LBA)), an object storage appears as a collection of objects.

The object storage uses rich metadata attached to the data to carry "information about the information." The metadata in the object storage enables users to easily search for data without knowing specific filenames, directory location, dates or any traditional file designations.

An individual object is a container of storage (object-data and object-metadata) that exposes an interface similar to a file. An object is different from a file in that a unique identifier is assigned and associated with each object. It allows objects to be stored in an infinitely vast flat address space containing billions of objects without the complexity file systems impose. Hence there is no directory hierarchy and the object's location does not have to be specified in the same way that a file's directory path has to be known in order to retrieve it.

Lower-level functionalities such as space management can be handled by the storage device, while the device is accessed through a standard object interface. The standard object store device (OSD) interface was defined by the SNIA OSD working group. The protocol is embodied over SCSI and defines a new set of SCSI commands, standardized as a T10 protocol.

SUMMARY

A method and an object based storage system for managing logical objects is disclosed. The storage system includes a plurality of control servers and the method includes: (i) defining a plurality of object pools and associating each logical object, hosted in the storage system, with one of the plurality of object pools; (ii) configuring each control server to have a primary responsibility over at least two of the object pools, such that each object pool is controlled by one primary control server, configured to handle requests directed to logical objects associated with the object pool; and (iii) in response to a failure of one of the plurality of control servers, configuring each operational server of the plurality of control servers to take over primary responsibility for at least one object pool, originally defined under the primary responsibility of the failed control server.

The associating includes generating an object identifier related to each logical object, wherein the object identifier is a value depended on an identifier of the object pool.

The associating may include uniformly distributing logical objects among the plurality of object pools.

The defining of the plurality of object pools includes determining a number of the object pools, in a way that enables an even sharing of responsibility for the object pools among the plurality of control servers, both in case all control servers are operational and in case one of the plurality of control servers is failed.

The number of the object pools may be determined in accordance with a function: $N*(N-1)$, wherein N is the number of control servers.

Each operational server may be configured to take over primary responsibility for an equal share of object pools, currently defined under the primary responsibility of the one failed control server.

Each control server is configured to have a secondary responsibility for at least two other pools of the plurality of object pools, such that each object pool is controlled by at least one secondary control server, configured to take over the primary responsibility for handling requests directed to logical objects assigned to the at least two other pools, in case the primary control server fails.

Responsive to receiving an access request indicative of an object identifier related to a first logical object, identifying, in accordance with the object identifier, a first object pool associated with the first logical object, and directing the access request to a first control server configured with a primary responsibility for the first object pool.

The identifying may include deriving an identifier of the first object pool from a value of the object identifier.

Each object store, configured in said storage system, may be logically divided into a plurality of space pools, each space pool is configured to host data and metadata related to objects of a respective object pool, each space pool includes a consecutive address block range within the object store.

The primary responsibility of each control server further includes responsibility for managing at least two space pools of the plurality of space pools, respectively associated with the at least two object pools.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the present invention can be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "activating", "recognizing", "identifying", "selecting", "allocating", "managing" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, storage system and parts thereof disclosed in the present applications.

The operations in accordance with the teachings herein can be performed by a computer specially constructed for the desired purposes or by a general-purpose computer specially configured for the desired purpose by a computer program stored in a computer readable storage medium.

Figure 1:
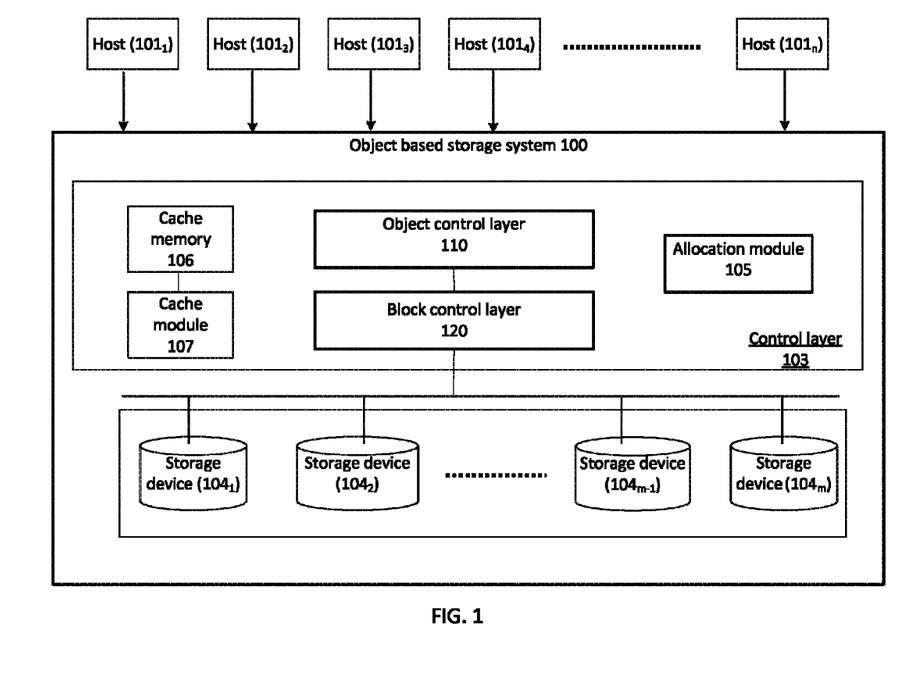
FIG. 1 illustrates a schematic functional block diagram of an object based storage system, in accordance with embodiments of the presently disclosed subject matter.
Figure 2A:
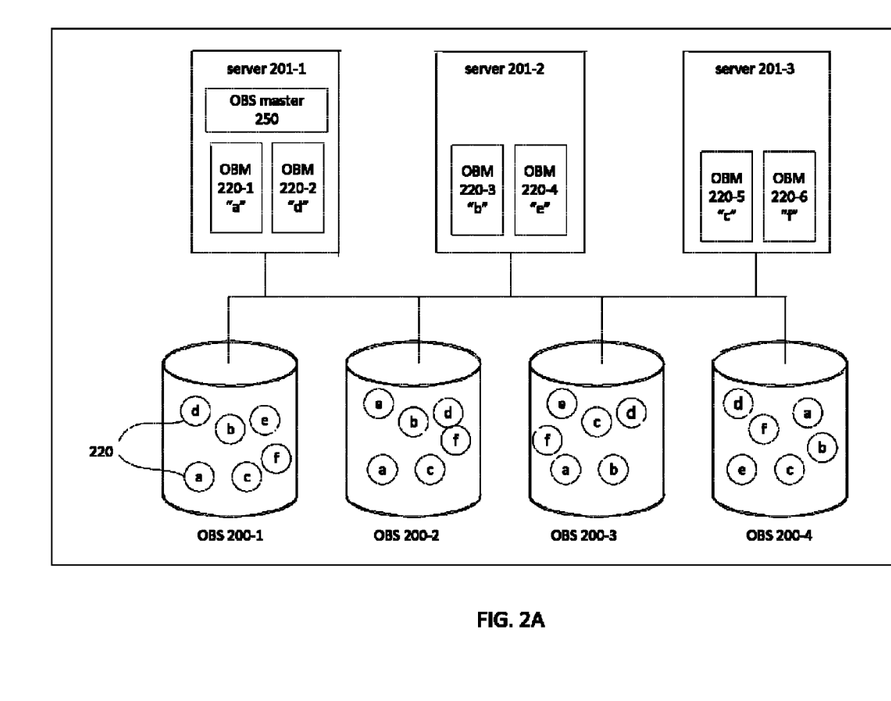
FIG. 2A illustrates certain aspects and functional blocks of the object based storage system, in accordance with embodiments of the presently disclosed subject matter.

FIG. 1 illustrates a schematic block diagram of an object based storage system 100 configured to handle logical objects in accordance with certain embodiments of the presently disclosed subject matter. Storage system 100 comprises a plurality of data storage devices 104-1-104-m constituting a physical storage space and a storage control layer 103 comprising a plurality of computerized nodes (as further detailed in FIG. 2), operatively coupled to the plurality of storage devices 104-1-104-m and to a plurality of host computers 101-1-101-n that share common storage means provided by storage system 100, wherein storage control layer 103 is configured to control interface operations (including I/O operations) there between. Storage control layer 103 is further configured to handle a virtual representation of the physical storage space and to facilitate necessary mapping between the physical storage space and its virtual representation. The virtualization functions can be provided in hardware, software, firmware or any suitable combination thereof. Optionally, the functions of the control layer can be fully or partly integrated with one or more host computers and/or storage devices and/or with one or more communication devices enabling communication between the hosts and the storage devices. Optionally, a format of logical representation provided by the control layer can differ depending on interfacing applications.

The physical storage space can comprise any appropriate non-transitory permanent storage medium and include, by way of non-limiting example, one or more disk drives and/or one or more disk units (DUs), comprising several disk drives. The storage control layer and the storage devices can communicate with the host computers and within the storage system in accordance with any appropriate storage protocol.

The physical storage space further includes a plurality of physical data blocks, each physical data block may be characterized by a pair (DDid, DBA) where DDid is a serial number associated with the disk drive accommodating the physical data block, and DBA is a block number within the respective disk.

The entire address space of the storage system is divided into logical volumes, and each logical volume becomes an addressable device. A logical volume (LV) or logical unit (LU) represents a plurality of data blocks characterized by successive Logical Block Addresses (LBA). Different logical volumes may comprise different numbers of data blocks, which are typically of equal size within a given system (e.g. 512 bytes).

Control layer 103 can be divided into two control sub-layers: an object control layer 110 and block control layer 120. Object control layer 110 is configured to provide necessary translation of high-level requests, directed to objects stored in storage system 100, into block-oriented requests to be handled by block control layer 120. Object control layer 110 is further configured to handle metadata related to the objects. Block control layer 120 is configured to access physical blocks related to objects in the physical storage space in accordance with block oriented requests received from object control layer 110 and is further configured to manage the logical volumes included in storage system 100.

External hosts can access object control layer 110, using the OSD-3 SCSI protocol or any other object interfacing protocol for creating and deleting objects, writing bytes and reading bytes to and from individual objects, and to set/get attributes of objects. Any transport (i.e. any lower-level protocol) which is capable of encapsulating SCSI commands is therefore a valid transport. This includes FibreChannel and iSCSI transports.

In addition, control layer 103 can also implement an internal file system which leverages the OSD protocol internally. In the preferred embodiment, the file system is implemented by creating a separate object for each file and a separate object for each directory. In order to accommodate for access by external hosts, a networked file system server program executes in each server, for example an NFS server or CIFS server that externalize the internal file system.

The storage control layer can further comprise an allocation module 105, a cache memory 106 operable as part of the i/o flow in the system, and a cache control module 107, that regulates data activity in the cache and controls destage operations.

Allocation module 105, cache memory 106 and/or cache control module 107 can be implemented as centralized modules operatively connected to the plurality of computerized nodes or can be distributed over a part or all the computerized nodes.

Certain embodiments of the presently disclosed subject matter are applicable to the storage architecture of a computer system described with reference to FIG. 1. However, the disclosed subject matter is not bound by the specific architecture; equivalent and/or modified functionality can be consolidated or divided in another manner and can be implemented in any appropriate combination of software, firmware and hardware. In different embodiments of the presently disclosed subject matter the functional blocks and/or parts thereof can be placed in a single or in multiple geographical locations (including duplication for high-availability); operative connections between the blocks and/or within the blocks can be implemented directly (e.g. via a bus) or indirectly, including remote connection. The remote connection can be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.).

FIG. 2 illustrates control layer 103 as including a plurality of computerized nodes, such as control servers 201-1, 201-2 and 201-3. Control servers 201-1, 201-2 and 201-3 are interconnected and configured to co-implement object control layer 110 and block control layer 120. According to one embodiment all control servers implement both object control layer 110 and block control layer 120. According to another embodiment, part of the control servers implement object control layer 110, while other control servers implement block control layer 120.

Storage system 100 is configured to implement at least one object store, such as object stores (OBS) 200-1-200-4 that store multiple objects 230. Each object store 200 can be regarded as a flat space container of objects. Storage system 100 is configured to assign a dedicated logical volume to each object store 200, while the address space of the volume, virtual and physical block allocation related to the volume are handled in block control layer 120.

Objects 230 are flexible-sized data containers that include user data, metadata assigned by the system and attributes associated to the object by the user. The user data of an object may be of various contents, such as multimedia files or streams, emails, text files or any application dependent files.

Object control layer 110 includes at least one object storage master 250 (OBSMR) responsible for management of all object stores 200, including creation and deletion of object stores. Preferably, there is one active object storage master for the entire storage system. The role of mastering the object storage can be assigned to one server of control layer 103, as illustrated in FIG. 2 or the object storage master can be a separate computerized entity.

Objects 230 are assigned to object stores 200 upon object creation and the object store desired for hosting the a object is indicated in the creation request issued by the user.

In addition to assigning objects to objects stores according to user requests, objects 230 are further assigned to object pools, by object storage master 250, according to embodiments of the presently disclosed subject matter.

The entire objects stored in storage system 100 are divided into a plurality of arbitrary object pools and each control server 201 is responsible for managing part of the object pools. The role of the object pool is to group objects that are managed by a specific control server. In order to facilitate dynamic association of objects with a specific control server (the association of objects to a specific server is changed when the specific server fails and another server need to be associated with these objects), objects are associated with an object pool, rather than being associated with a server, and the object pool is assigned to a server. In this manner, a server failure requires reassigning the object pool(s) that are under the supervision of the failed server to another server, rather than reassigning each and every object under the supervision of the failed server.

Each control server may include one or more object managers (OBM), wherein each object manager (OBM) is a module responsible for managing the objects within one object pool. For example: control server 201-1 includes an OBM 220-1 that manages object pool "a" and OBM 220-2 that manages object pool "d"; control server 201-2 includes an OBM 220-3 that manages object pool "b" and OBM 220-4 that manages object pool "f"; and control server 201-3 includes an OBM 220-5 that manages object pool "c" and OBM 220-6 that manages object pool "f".

Object management includes handling requests directed to specific objects (create, delete, read/write) including handling metadata of the objects, space allocation, communicating with block control layer 120 for accessing data related to objects, etc.

Each object pool is associated with objects that belong to different object stores and vice versa, the objects within each single object store are associated with different object pools and therefore objects of the same object store are handled by different control servers. As demonstrated in FIG. 2, objects of object pool "a", for example, can be found in every object store 200. The same applies for the other object pools b-f. Object store 200-1 includes objects from all object pools, managed by all control servers: an object from object pool "a" that is managed by control server 201-1, an object from object pool "b" that is managed by control server 200-2, an object from object pool "c" that is managed by control server 200-3, etc. According to one embodiment, all object pools include a similar or almost equal number of objects.

The number of object pools in the system is determined such that the object pools are evenly shared among servers, in both the following cases: (i) all the servers are operational; and (ii) one server is failed and the rest of the servers manage all the object pools including those that were initially assigned to the failed server. Therefore, the number of the object pools may be dictated by the number of control servers in the control layer. If the number of the control servers is $N_{Srv}$, then the number of the object pools is preferably $N_{pool}=N_{Srv}*(N_{Srv}-1)$. For example, if the number of control servers is three, then the number of pools is six (=3*(3−1)). Preferably, each control server is assigned with an equal share of $N_{Pool}/N_{Srv}$ pools, for example, in case of three control servers and six pools, each control server is assigned with two pools, when all the servers are operational. When one server is failed, each of the rest operational servers is assigned with $N_{Pool}/(N_{Srv}-1)$ pools, for example, when two servers remain operational, each manages three pools.

New objects are assigned to object pools upon object creation, preferably according to distribution fairness approach. One example of a fair balanced distribution is a uniform distribution, which may be used when all control servers are assumed to have a similar computation capabilities and/or the objects are assumed to consume similar computing resources. According to other embodiments, the fairness of distribution can take into consideration the respective computing power of the server that is responsible for the object pool. According to further embodiments, each object pool can be associated with different characteristics of objects. For example: (i) object pools that are associated with popular objects (frequently accessed objects) are assigned with fewer objects than object pools with less popular objects (rarely accessed objects); (ii) object pools may be assigned with objects with expected access complex (e.g. multimedia files that have strict requirements for low latency), in which case such object pools are assigned with fewer objects than object pools intended to be assigned with objects that do not have any latency requirements.

Each new object is assigned with an object identifier (OID). The OID serves as a unique identifier of the object among all objects in the system, but also serves for correlating the object to the selected object pool (and thus correlating the object to a specific control server that manages the object pool). The OID and the object pool identifier (which may be a running index $1-N_{Pool}$, e.g. 1-6) are correlated in such a manner that given an OID, the object pool identifier can be determined from that OID and vice versa, selecting an object pool for a new object dictates its OID. For example: suppose new objects are assigned to object pools in a round robin manner, e.g. the first created object is assigned to the first object pool, the second created object is assigned to the second object pool, the sixth created object is assigned to the sixth object pool, and the seventh object is assigned to the first object pool again. Once the object pool has been selected by the round robin assignment, the OID may be chosen to be a function of the object pool index, so that given a specific OID the object pool index is given by the formula. Non limiting examples for obtaining the object pool identifier from the OID: (i) the object pool index serves as the most significant part of the OID, so that the object pool index can be extracted from the most significant bits in the OID; (ii) if the OID is a running index and the objects are assigned in a round robin manner, the object pool index can be determined by applying the function: ((OID-1) modulo 6)+1. For example: an OID 36 is associated with object pool 6, OID 37 is associated with object pool 1, and OID 2 is associated with object pool 2; (iii) Another approach may be assigning the OID first by using a uniform distribution random function and then using a function, e.g. a hash function or a modulo function that selects a object pool 1 to 6, based on the OID. The ability to extract/obtain the object pool identifier from the OID eliminates the need to handle translation tables for correlating object pools with their associated objects.

Given that each specific object is assigned to a specific pool, which is further assigned to a control server, it turns that the specific object is handled within a given control server, and not within the others (except, of course, in the case of server failure).

Figure 2B:
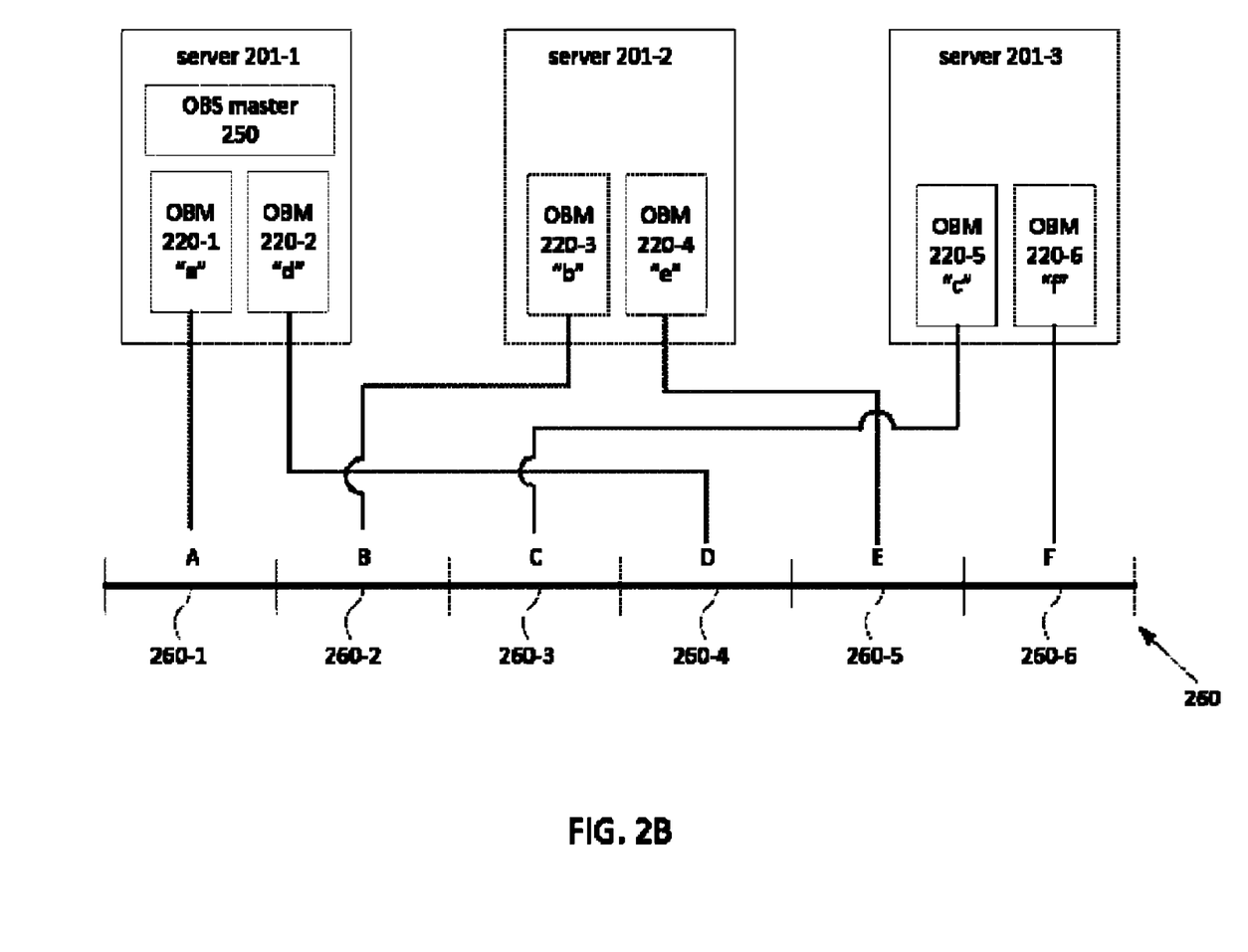
FIG. 2B illustrates further aspects and functional blocks of the object based storage system, in accordance with embodiments of the presently disclosed subject matter.

In addition to the responsibility for managing all objects in an object pool, each server is further responsible for managing a logical address space reserved for the objects in the certain object pool. Each logical volume that is assigned for an object store is logically divided into $N_{Pool}$ space pools, each is a consecutive address block range within the logical volume. Each space pool is configured to host data and metadata related to objects of a respective object pool. FIG. 2B illustrates a logical address range 260, related to a logical volume that hosts an object store such as object stores 200-1-200-4. Logical address range 260 is divided into six space pools "A"-"F", 260-1-260-6. Each space pool 260 is reserved for objects of a respective object pool that are hosted in the specific object store. For example, space pool "A" 260-1 in e.g. object store 200-1, is reserved for objects hosted in object store 200-1 and associated with object pool "a", space pool "B" 260-2 in object store 200-1 is reserved for objects hosted in e.g. object store 200-1 and associated with object pool "b", space pool "F" 260-6 is reserved for objects hosted in object store 200-1 and associated with object pool "f", etc. Since server 201-1 is responsible for managing objects in object pool "a" (by OBM 220-1), server 201-1 is further responsible for managing space pool "A" 260-1 of object store 200-1. Server 201-1 is further responsible for managing all respective space pools "A" in all object stores 200, that all together accommodate objects of object pool "a". In a similar manner: server 201-1 is responsible for managing all respective space pools "D" in all object stores 200, that all together accommodate objects of object pool "d"; server 201-2 is responsible for managing all respective space pools "B" and "E" in all object stores 200; and server 201-3 is responsible for managing all respective space pools "C" and "F" in all object stores 200.

Each space pool 260, which is a portion of the total space of an object store, is managed as if it was an independent object store, including for example: space management, OID table that includes metadata only for objects stored in the space pool, trash management, etc. Responsibility for a certain object pool therefore includes management of respective space pools in all object stores, reserved for objects associated with the certain object pool.

Figure 3:
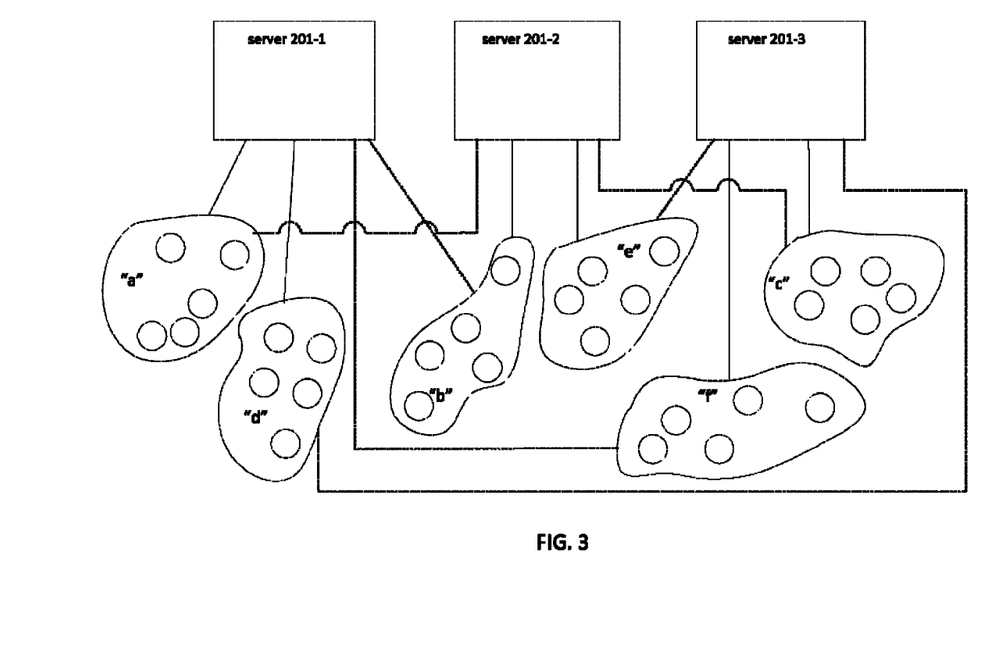
FIG. 3 illustrates further aspects and functional blocks of the object based storage system, in accordance with embodiments of the presently disclosed subject matter.

Utilizing the pool grouping approach, the responsibility for the objects, is distributed among the control servers, in such a manner that each control server is assigned with primary responsibility (i.e. as a primary server) over a $1/N_{Srv}$ of the pools, e.g. at least two object pools, in case the control layer is composed of at least three servers, and is assigned with secondary responsibility (i.e. as a secondary sever) over another $1/N_{Srv}$ of the pools, e.g. at least two additional object pools. Each object pool is controlled by at least two control servers—primary server and secondary server. FIG. 3 schematically illustrates all the objects stored in storage system 100, their grouping and the responsibility of each control server to part of the pools. FIG. 3 illustrates control server 201-1 as having a primary responsibility over all objects in object pools "a" and "d" and as having a secondary responsibility (represented as dashed lines) over all objects in object pools "b" and "f"; control server 201-2 is illustrated as having a primary responsibility over all objects in object pools "b" and "e" and as having a secondary responsibility over all objects in object pools "a" and "c" and control server 201-3 is illustrated as having a primary responsibility over all objects in object pools "c" and "f" and as having a secondary responsibility over all objects in object pools "d" and "e". Preferably, the object pools under the second responsibility of a certain server are under a primary responsibility of respective two other servers. For example, control server 201-1 has a secondary responsibility over object pool "b", which is under a primary responsibility of control server 201-2 and has also a secondary responsibility over object pool "f", which is under a primary responsibility of control server 201-3. This distribution of secondary responsibilities enables fair sharing of the overload, resulted by a failure of one server, among the remaining operational servers.

It is noted that the primary and secondary responsibilities over object pools further entails primary and secondary responsibilities for managing the respective space pools in all the object stores.

It should be noted that responsibility of a certain server may be changed during the operation of the storage system, and the terms "primary server" and "secondary servers" in the following description are related to pre-assigned responsibility of the servers. For example, the secondary server may operate with the primary responsibility during takeover and recovery/re-take processes.

Each control server can receive requests from hosts, directed to any of the objects stored in storage system 100, whether or not these requests are directed to objects under the responsibility of the receiving server. Upon receiving a request related to a certain object, the receiving server can use the OID of the object, included in the request, for determining the object pool, by applying a predefined formula on the OID. If the object pool is not a pool being managed by the receiving server, as a primary server, then the receiving server redirect the request to the control server that is defined with a primary responsibility for the object pool. The information related to assignment of primary and secondary responsibilities of servers to pools (e.g. a table that indicates for each pool, which server has the primary responsibility and which server has the secondary responsibility for the pool) can be managed by object storage manager 250 that is also responsible for distributing this information among the servers or to store the information in a memory accessible by all servers.

The terms "primary responsibility" or "primary control" with regard to an object pool should expansively mean that the control server handles all I/O requests directed to objects associated with the respective object pool. When the host sends a write request to the system directed to a certain object associated with a certain pool, the respective control server with primary responsibility temporarily stores the modified data and/or metadata of the respective object in the cache memory, and is eventually responsible to handle it so that respective data and/or metadata ends up being permanently stored in the correct address and disk drive. The control server with primary responsibility is also responsible for retrieving the data/metadata of the object each time that the host requests it. In accordance with certain embodiments of the present invention, when, responsive to an I/O request directed to an object in a specific pool, the control server with primary responsibility over the specific pool generates a primary cached object to be stored in its cache memory, it also enables generating corresponding redundant object to be stored in the cache memory of the control server having secondary responsibility over that specific pool. The primary server acknowledges the transaction to the host only after receiving acknowledgement from the secondary server that the redundant object is generated in its cache memory. Upon successful permanent storing the data in the disk drives, the primary server informs the secondary server that the secondary server can delete the redundant object from its cache. However, if the primary server fails in permanently storing the data in the disks, the secondary server takes over primary responsibility on the specific pool and on permanent storing the data and uses the redundant object for further operating. The primary server with regard to the specific pool is the only one that can handle and modify the metadata of the object.

Suppose an I/O request directed to a certain object in that certain object pool arrives to a second server, referred to as a receiving server. One way to handle now the I/O request is that the I/O request be redirected to the primary server (the server with primary responsibility over the certain pool) and handled there in its entirety. Alternatively, we can have the I/O request handled in its entirety in the receiving server, but with the help of the primary server. Thus, the receiving server may send a message to the primary server requesting that the primary server handles the metadata of the object and returns the relevant information to the receiving server for further handling of the IO. In both cases, the primary server handles the metadata, as part of the handling of the IO, and in particular, it handles allocation issues, i.e., the primary server looks for empty blocks within the volume associated with the object store of the certain object, in order to allocate there the new data related to the certain object. The primary server works out the details of the I/O request and updates the metadata and instructs the second server how to proceed.

Upon a failure of a control server, the responsibility for pools (object pools as well as the corresponding space pools) related to the failed server is redistributed and the remaining operational servers take over primary responsibility for pools that were assigned to the remaining operational servers as their secondary responsibility. For example: suppose control server 201-1 in FIG. 3 is failed. Server 201-1 had a primary responsibility for object pools "a" and "d", prior to its failure. The remaining operational servers are control server 201-2 and control server 201-3. Control server 201-2, which had a secondary responsibility for object pool "a" prior to failure, takes the primary responsibility for object pool "a" after the failure of control server 201-1 and control Server 201-3, which had a secondary responsibility for object pool "d" prior to failure, takes the primary responsibility for object pool "d" after the failure of control server 201-1. Splitting, among servers, the secondary responsibility for pools that are under the primary responsibility of a single server, allows sharing the excess load of handling additional pools, among the remaining servers, upon a server failure.

Figure 4:
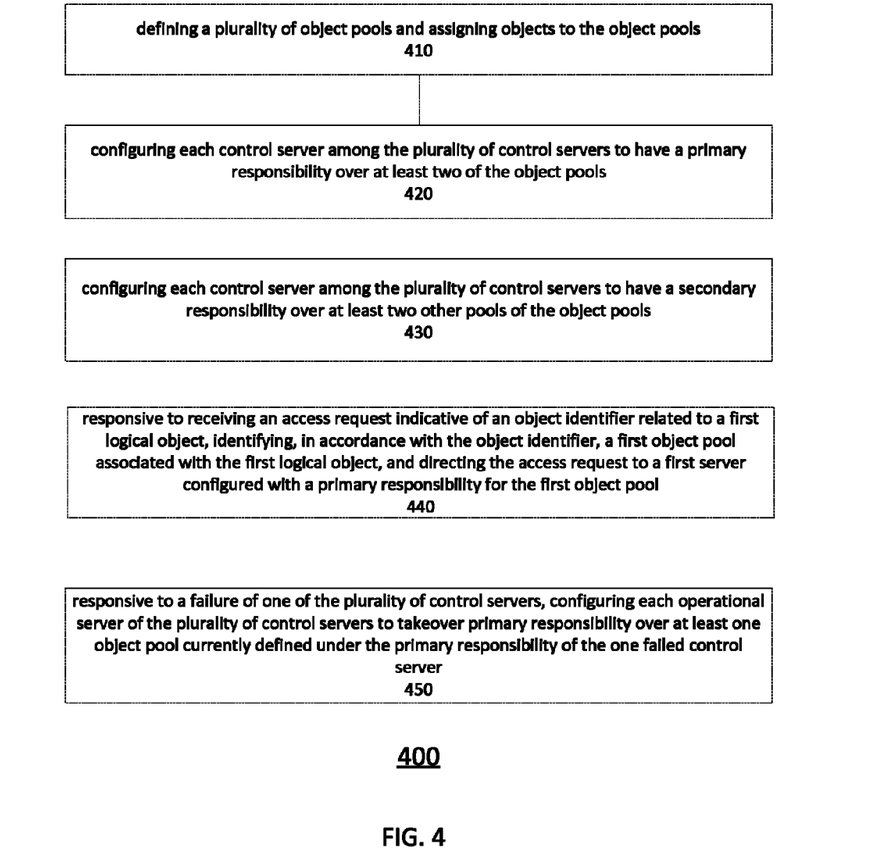
FIG. 4 illustrates a generalized flow diagram of managing objects by a plurality of control servers, in accordance with embodiments of the presently disclosed subject matter.

FIG. 4 illustrates a method 400 for managing objects in storage system 100. Method 400 includes step 410 of defining a plurality of object pools and associating each logical object, hosted in the storage system, with one of the object pools. Step 410 may be performed by object storage master 250.

The associating can use a predefined fair distribution scheme, such as: round robin, WRR (weighted round robin), uniform distribution, discrete probability distribution, etc. The grouping of objects may be arbitrary or may take into consideration properties of the responsible server and/or properties of the objects.

Using a uniform distribution for associating logical objects and object pools may be implemented for example, by using a round robin approach for assigning objects to the object pools or by selecting an object pool using a uniform distribution function. The associating includes creating the OID as a value depended on an identifier of the object pool as a univocal relation, so that for a given OID, the pool identifier can be derived or extracted, using a predefined function.

Defining the plurality of object pools further includes dividing each object store in the system into multiple space pools. The number of object pools is equal to the number of space pools and each object pool is respectively associated with one of the space pools.

Method 400 includes step 420 of configuring each control server among the plurality of control servers to have a primary responsibility over part (at least two) of the object pools, such that each object pool is controlled by one primary control server, configured to handle requests directed to objects corresponding to the object pool.

The number of the object pools (and of space pools) is determined in a way that allows an even distribution of pools among control servers, both in case all control servers are operational and in case one server is failed and the remaining servers are required to share the overload resulted by the failure. For example, the number of pools is dependent upon the number of control servers according to the following formula: $N*(N-1)$, wherein N is the number of control servers. This enables assigning to each server, in case of all control servers are operational, an equal share of $N-1$ pools and further enable assigning to each server, in case one control server is failed, an equal share of N pools. Assigning objects to object pool using a fair distribution manner combined with assigning an equal share of pools to each control server, implies that each control server shares an equal workload, for example, in case the servers are equal and the fair distribution manner is a uniform distribution, each server manages an equal number of objects.

Method 400 includes a step 430 of configuring each control server among the plurality of control servers to have a secondary responsibility over another part (at least other two) of the object pools, such that each object pool is controlled by at least one secondary control server, configured to take over the primary responsibility for handling respective requests directed to objects assigned to the other part of the object pools, in case the primary server fails. Steps 420 and 430 may be performed by object storage master 250.

Method 400 includes step 440 of, responsive to receiving an access request indicative of an OID related to a first object, identifying, in accordance with the OID, a first object pool associated with the first object, and directing the access request to a first server configured with a primary responsibility for the first object pool. The identifying is by deriving the identifier of the first object pool from a value of the OID. Step 440 may be performed by each control server 201.

Method 400 includes step 450 of, responsive to a failure of one of the control servers, configuring each of the other operational servers to take over primary responsibility for at least one object pool, originally defined under the primary responsibility of the one failed server. Subsequent execution of step 440 wherein access requests are directed to objects associated with the at least one object pool will be handled by the operational server that has took over the responsibility for the at least one object pool. Step 450 may further include configuring each operational server to take over primary responsibility for an equal share of object pools related to the failed server. For example: in case of a failure of one server out of three servers, the failed server was responsible for two pools, so each non-failed server takes over one of the two pools of the failed server. Step 450 may be performed by object storage master 250 or each control server 201 with a relevant secondary responsibility may take over the primary responsibility, as was predefined in step 430 by the object storage master 250.

Those skilled in the art will readily appreciate that the presently disclosed subject matter is not bound by migration in virtual machine environment and can be implemented, likewise, for migration of any data portion from a source logical volume to a destination logical volume.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

Those skilled in the art will readily appreciate that various modifications and changes can be applied to the embodiments of the presently disclosed subject matter as hereinbefore described without departing from its scope, defined in and by the appended claims.

The invention claimed is:

1. A method of managing logical objects in a storage system comprising a plurality of control servers, operatively connected to a physical storage space, the method comprising:

defining a plurality of object pools and associating each logical object, hosted in said storage system, with one of said plurality of object pools; wherein a number of object pools in said plurality of object pools is determined in accordance with a function $N*(N-1)$, wherein N is a number of control servers in the plurality of control servers;

configuring each control server among said plurality of control servers to have a primary responsibility over at least two of said plurality of object pools, such that each object pool is controlled by one primary control server, configured to handle requests directed to logical objects associated with said object pool; and responsive to a failure of one of said plurality of control servers, configuring each operational server of said plurality of control servers to take over primary responsibility for at least one object pool, originally defined under the primary responsibility of said one failed control server.

2. The method of claim 1, wherein said associating comprises generating an object identifier related to said each logical object, wherein said object identifier is a value depended on an identifier of said one object pool.

3. The method of claim 1, wherein said associating comprises uniformly distributing logical objects among said plurality of object pools.

4. The method of claim 1 wherein said configuring comprises configuring each operational server to take over primary responsibility for an equal share of object pools, currently defined under the primary responsibility of said one failed control server.

5. The method of claim 1 comprising, responsive to receiving an access request indicative of an object identifier related to a first logical object, identifying, in accordance with said object identifier, a first object pool associated with said first logical object, and directing said access request to a first control server configured with a primary responsibility for said first object pool.

6. The method of claim 5, wherein said identifying comprises deriving an identifier of said first object pool from a value of said object identifier.

7. The method of claim 1, wherein multiple object stores are handled by the storage system, wherein the method further comprising logically dividing a space of each object store of the multiple object stores into a plurality of space pools, wherein each space pool is associated with a certain object pool and configured to host data and metadata related to objects associated with the certain object pool, each space pool comprises a consecutive address block range within the object store.

8. The method of claim 7, wherein the primary responsibility further includes responsibility for managing at least two space pools of said plurality of space pools in each said object store, respectively associated with said at least two object pools.

9. A method of managing logical objects in a storage system comprising a plurality of control servers, operatively connected to a physical storage space, the method comprising:

defining a plurality of object pools and associating each logical object, hosted in said storage system, with one of said plurality of object pools;

configuring each control server among said plurality of control servers to have a primary responsibility over at least two of said plurality of object pools, such that each object pool is controlled by one primary control server, configured to handle requests directed to logical objects associated with said object pool;

configuring each control server among said plurality of control servers to have a secondary responsibility for at least two other pools of said plurality of object pools, such that each object pool is controlled by at least one secondary control server, configured to take over the primary responsibility for handling requests directed to logical objects assigned to said at least two other pools, in case said primary control server fails; and in response to a failure of one of said plurality of control servers, configuring each operational server of said plurality of control servers that is configured as a secondary control server for at least one object pool originally defined under the primary responsibility of said one failed control server, to take over primary responsibility for the at least one object pool.

10. The method of claim 9, wherein said defining of said plurality of object pools comprises determining a number of said object pools, in a way that enables an even sharing of responsibility for said object pools among said plurality of control servers, both in case all control servers are operational and in case one of said plurality of control servers is failed.

11. A storage system comprising a plurality of interconnected control servers and an object storage master;
wherein said object storage master is configured to:
define a plurality of object pools and associate each logical object, hosted in said storage system, with one of said object pools;
determine a number of object pools in said plurality of object pools in accordance with a function N*(N−1), wherein N is a number of control servers in the plurality of interconnected control servers; and
configure each control server among said plurality of interconnected control servers to have a primary responsibility over at least two of said object pools, such that each object pool is controlled by one primary control server, configured to handle requests directed to logical objects associated with said object pool;
wherein responsive to a failure of one of said plurality of control servers, each operational control server is configured to take over primary responsibility for at least one object pool, originally defined under the primary responsibility of said one failed control server.

12. The storage system of claim 11, wherein said each operational control server is configured to take over primary responsibility for an equal share of object pools, currently defined under the primary responsibility of said one failed control server.

13. The storage system of claim 11, wherein responsive to receiving, by a receiving server of said plurality of control servers, an access request indicative of an object identifier related to a first logical object, the receiving server is configured to identify, in accordance with said object identifier, a first object pool associated with said first logical object, and to direct said access request to a first control server configured with a primary responsibility for said first object pool.

14. The storage system of claim 13, wherein said receiving server is configured to identify said first object pool by deriving an identifier of said first object pool from a value of said object identifier.

15. The storage system of claim 11, wherein the storage system is configured to handle multiple object stores, wherein a space of each object store of the multiple object stores is logically divided into a plurality of space pools, wherein each space pool is associated with a certain object pool and configured to host data and metadata related to objects associated with the certain object pool, wherein each space pool includes a consecutive address block range within the object store.

16. The storage system of claim 15, wherein the primary responsibility further includes responsibility for managing at least two space pools of said plurality of space pools in each said object store, respectively associated with said at least two object pools.

17. A storage system comprising a plurality of interconnected control servers and an object storage master;
wherein said object storage master is configured to:
define a plurality of object pools and associate each logical object, hosted in said storage system, with one of said object pools;
configure each control server among said plurality of interconnected control servers to have a primary responsibility over at least two of said object pools, such that each object pool is controlled by one primary control server, configured to handle requests directed to logical objects associated with said object pool;
configure each control server among said plurality of interconnected control servers to have a secondary responsibility for at least two other pools of said plurality of object pools, such that each object pool is controlled by at least one secondary control server, configured to take over the primary responsibility for handling requests directed to logical objects assigned to said at least two other pools, in case said primary control server fails;
wherein in response to a failure of one of said plurality of control servers, each operational control server of said plurality of control servers that is configured as a secondary control server for at least one object pool originally defined under the primary responsibility of said one failed control server, is configured to take over primary responsibility for the at least one object pool.

18. The storage system of claim 17, wherein said object storage master is configured to determine a number of said object pools, in a way that enables an even sharing of responsibility for said object pools among said plurality of control servers, both in case all control servers are operational and in case one of said plurality of control servers is failed.

* * * * *